United States Patent [19]

Rud, Jr.

[11] 4,120,206

[45] Oct. 17, 1978

[54] DIFFERENTIAL PRESSURE SENSOR CAPSULE WITH LOW ACCELERATION SENSITIVITY

[75] Inventor: Stanley E. Rud, Jr., Eden Prairie, Minn.

[73] Assignee: Rosemount Inc., Minneapolis, Minn.

[21] Appl. No.: 759,837

[22] Filed: Jan. 17, 1977

[51] Int. Cl.² .............................................. G01L 9/12
[52] U.S. Cl. ...................................... 73/718; 361/283
[58] Field of Search ................ 73/398 C, 393, 407 R, 73/398 R, 398 AR, 718, 724; 361/283

[56] References Cited

U.S. PATENT DOCUMENTS 3,618,390  10/1969  Frick .................................. 73/398 C

FOREIGN PATENT DOCUMENTS 1,064,197  4/1967  United Kingdom .................. 73/407 R Primary Examiner—Donald O. Woodiel
Attorney, Agent, or Firm—Nickolas E. Westman

[57] ABSTRACT

A capacitance type differential pressure sensor which includes isolation diaphragms and incompressible fluid filling so that the sensing element does not have to be exposed to hostile fluids for pressure sensing and which isolation diaphragms are arranged in a manner to minimize sensitivity to acceleration forces encountered during use.

15 Claims, 4 Drawing Figures

DIFFERENTIAL PRESSURE SENSOR CAPSULE WITH LOW ACCELERATION SENSITIVITY

BACKGROUND OF THE INVENTION

1. Field of the Invention

The present invention relates to differential pressure sensors.

2. Prior Art

In the prior art there are various differential pressure sensors which use isolation diaphragms that permit the sensing units to be isolated from corrosive fluids that might be measured.

U.S. Pat. No. 3,618,390 issued to Roger L. Frick, illustrates a capacitance type differential pressure sensor that has isolation diaphragms, and wherein the pressure sensed by the isolation diaphragms is transmitted to the sensing diaphragm through an oil filling. In the sensor shown in U.S. Pat. No. 3,618,390, there is a substantial "head" of oil, and where the unit is subjected to acceleration forces, the accuracy can be adversely affected. However, the advantages of utilizing isolation diaphragms and an incompressible fluid which transmits the pressures from the isolation diaphragms to the sensing diaphragm are disclosed in this patent.

Other types of differential pressure sensors are shown in the prior art, for example German Publication No. 2,164,896 shows a differential pressure capsule similar to that shown in U.S. Pat. No. 3,618,390 except that it uses an electromagnetic or inductance type transducing element. The device shown in this German Publication does have isolation diaphragms, and apparently uses an oil filling to transmit pressure from the isolation diaphragms to the sensing unit.

British Pat. No. 1,335,873 also shows a differential pressure transducer having a variable reluctance transducing element, and showing annular isolation diaphragms, with an oil filling that transfers the pressure from the isolation diaphragms to the sensing assembly. In this particular British patent, corrugated central diaphragms are used to compensate for oil volume changes under differing temperatures.

U.S. Pat. No. 3,894,436 has annular corrugated flexible diaphragms and a centrally mounted diaphragm in the same plane as the annular diaphragms and with oil filling between opposite sides of a differential pressure cell. The central diaphragms in this device are the measuring diaphragms, and the annular outer diaphragms are present to take up volume changes in the oil due to temperature changes.

An electromagnetic differential pressure transducer which has an annular corrugated diaphragm is shown in U.S. Pat. Nos. 3,680,387, and 3,882,443 also shows a differential pressure transducer that utilizes oil filling, and isolation diaphragms acting through the oil filling to displace the sensing element. Temperature compensating diaphragms are also utilized in this device to absorb expansion and contraction of the oil or liquid used in the sensor.

SUMMARY OF THE INVENTION

The present invention relates to a low acceleration sensitive isolated differential pressure sensor that includes relatively flexible isolation diaphragms that transmit the differential pressure to be measured through fluid filled chambers to an isolated differential pressure sensing diaphragm. The flexible isolation diaphragms form chambers that open to the pressure sensing diaphragm, and the chambers are filled with an essentially incompressible dielectric fluid such as an oil which transmits the differential pressure from the flexible isolation diaphragms to the relatively stiff differential pressure sensing diaphragm. In the form shown, the pressure sensing diaphragm acts as a capacitor plate which deflects relative to two fixed electrodes. The sensitivity of the unit to acceleration forces is reduced by arranging the isolation diaphragms annularly around the stationary capacitor plates. The isolation diaphragms are positioned closely adjacent the plane of the deflecting diaphragm comprising the active sensing element. The positioning of the isolation diaphragms as disclosed greatly minimizes the effect of the oil filling insofar as sensitivity to acceleration or "g" forces is concerned and yet makes the sensor easy to manufacture, and satisfactorily accurate.

Additional benefits include the ability to make the sensor bodies of substantial thickness in the center portions, where the sensing elements are generally located in capacitance type sensors, without increasing the oil column or oil fill head.

The pressure fittings can come out through the sides of the unit if desired for simplicity in design, and when used with capacitance type sensors the generally accepted manufacturing techniques can be still used with this device.

The unit has a reduced time constant, that is, fast in response since there is little restriction in movement of oil with changing pressure, and the assembly can be relatively lightweight.

Additionally, adequate overpressure capabilities can be achieved by having the isolation diaphragms bottom out before the sensing diaphragm. Extremely flexible isolation diaphragms are provided to provide for volume changes of the oil due to temperature variations.

DESCRIPTION OF THE PREFERRED EMBODIMENT

Figure 1:
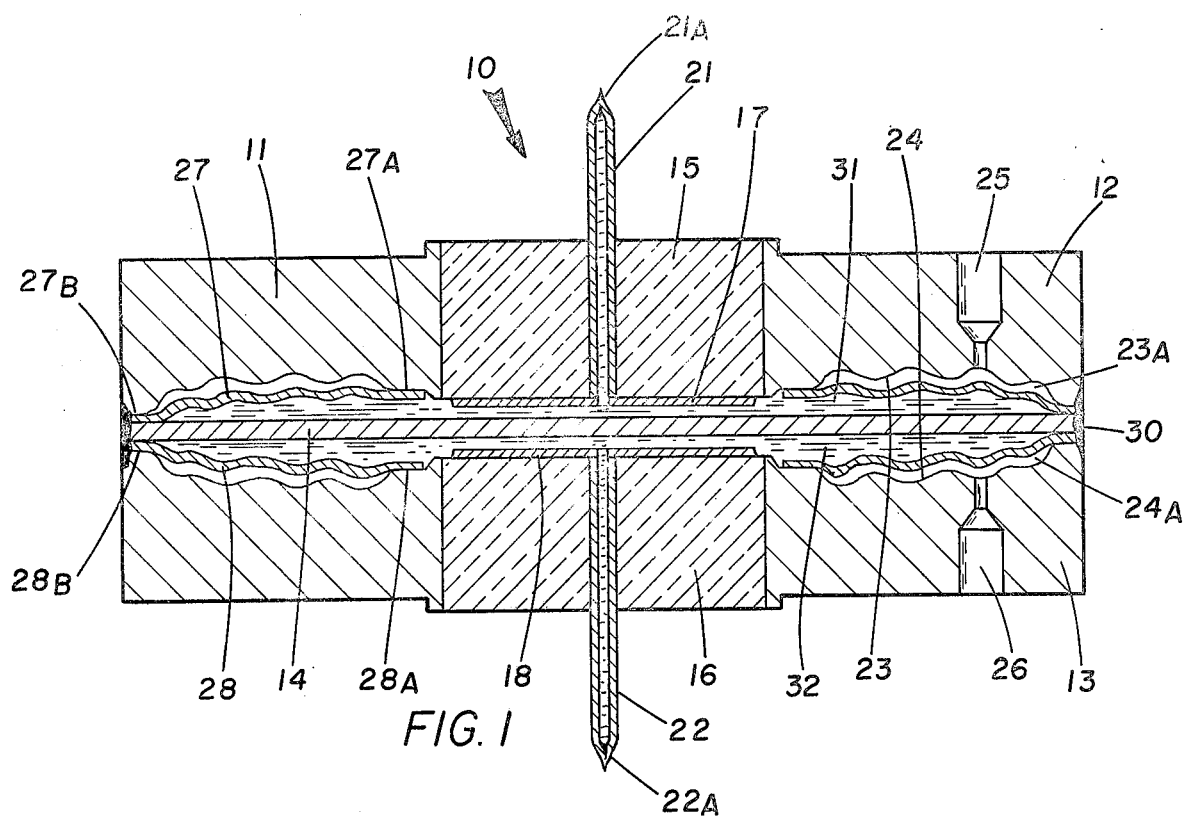
FIG. 1 is a vertical sectional view of a differential pressure transducer module made according to the present invention.

The pressure sensor module illustrated generally at 10 is for sensing differential pressures. The sensing module is shown in the present drawings, and a suitable outer housing that clamps the module in position and supports the module as desired is normally utilized. For example, a housing such as that shown in U.S. Pat. No. 3,618,390 identified above can be placed over this center sensing module. The only modification needed is to properly locate the position of electrical and pressure connections. This is well within the skill of persons working in the art.

The sensor module 10 includes a large housing assembly 11, which in the initial stages of manufacture is made into two half sections, 12 and 13 which are divided along a center parting line. A stretched measuring or sensing diaphragm indicated generally at 14 is positioned along this parting line in the form shown and thus is on the bisecting line of the module and extends transverse to the central axis of the housing assembly. The two housing sections 12 and 13 can be welded together, with the thin sensing diaphragm 14 in place in a well known manner.

Each of the metal housing sections 12 and 13 has a center opening formed therein, and a rigid insulation material indicated at 15 and 16, respectively fills this opening. For example, a glass or ceramic material can be fused into place in the center portion of the metal housings 12 and 13, to form central mounting portions which form rigid backings. The surfaces of the center portions 15 and 16 which face the diaphragm 14 are formed in a desired shape, such as flat or concave shape, and capacitor plate members of electrical conductive material indicated generally at 17 and 18 are deposited, or in some suitable manner mounted on these surfaces. These electrical conductive members 17 and 18 forming stationary capacitor plates are insulated from the respective housing by the material 15 and 16, respectively.

When the ceramic or glass material 15 and 16 is fused into place, metal tubes 21 and 22, respectively, which extend axially along the central axis of the housing assembly and through the glass or ceramic material are also fused into place. The inner ends of the tubes, that is near the center parting-line, are formed to be coplanar with the inner end surfaces of the material 15 and 16, so that when the capacitor plates 17 and 18 are deposited in place they form an electrical connection with these tubes 21 and 22.

Figure 2:
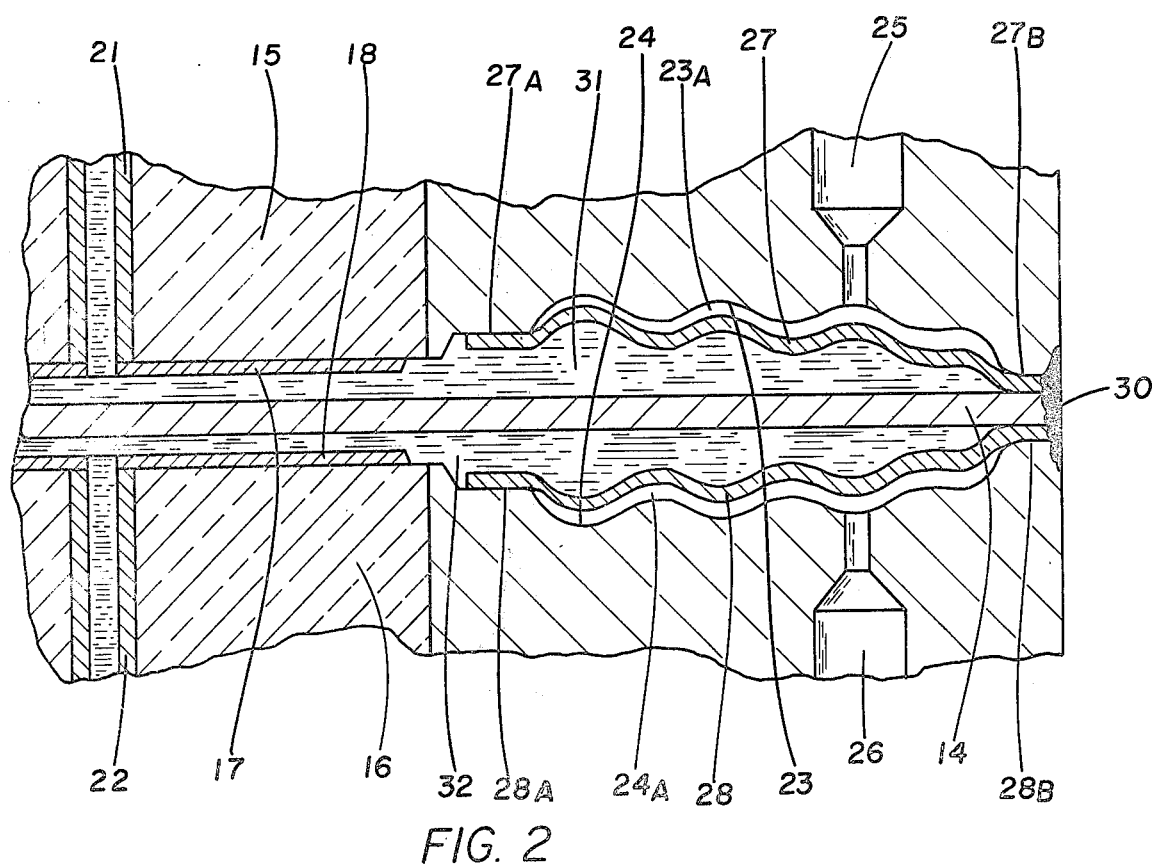
FIG. 2 is an enlarged sectional view taken as on the same line as FIG. 1, showing in greater detail the construction and relationship of the isolation and sensing diaphragms.

The metal housings 12 and 13 also have recessed surfaces 23 and 24, respectively. The recessed surfaces 23 and 24 surround the filling blocks of material 15 and 16. The recessed surfaces are generally corrugated as shown (the surface would be flat if a flat isolation diaphragm was used) in FIGS. 1 and 2 and define annular chambers 23A and 24A. Suitable pressure inlet passageways 25 and 26, respectively open through portions of the metal housings 12 and 13, respectively, to the recessed surfaces 23 and 24.

The annular chambers 23A and 24A are closed by annular, corrugated, flexible isolation diaphragm members 27 and 28, respectively. Isolation diaphragm members 27 and 28 are sealed against the respective housings 12 and 13, adjacent the inner edges of the diaphragm members as shown in 27A and 28A. This junction is near the periphery of the mounting portions or material 15 and 16 and therefore adjacent to and surrounding the respective capacitor plates 17 and 18 and almost co-planar therewith. This sealing can be a suitable brazing operation, seam welding, or any other type of joining operation that will seal the diaphragm members 27 and 28, respectively to their respective housings so that there is no pressure leakage from the chambers 23A and 24A that are formed.

The outer peripheral edge portions of the isolation diaphragms are typically sealed to the respective periphery or rim of the housing and to the edge of diaphragm 14 when the diaphragm 14 is fastened in place.

Figure 3:
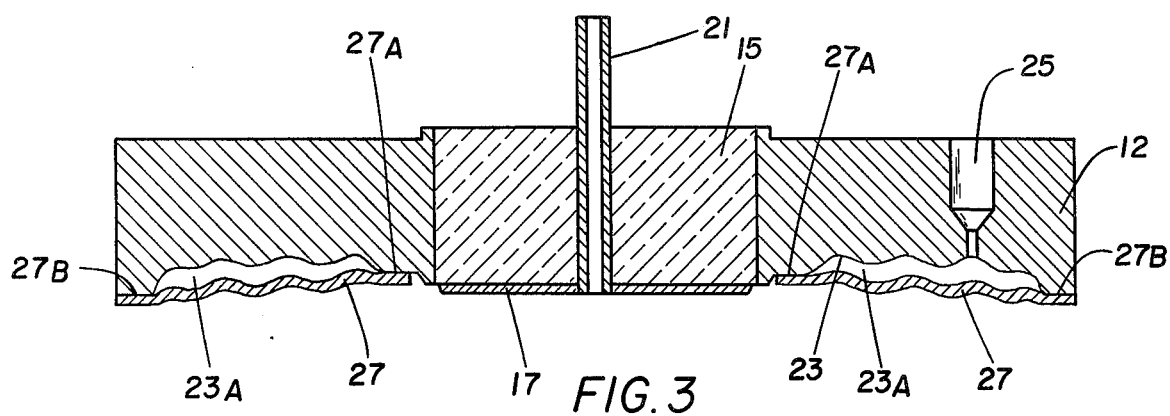
FIG. 3 is a vertical sectional view of one half of the sensor module during a first stage of manufacture.

Referring to FIG. 3, one half of the sensing module, for example the section indicated at 12 is illustrated in an intermediate stage of manufacture. The tube 21 is open, as shown and also as shown there is an opening through the plate 17.

Figure 4:
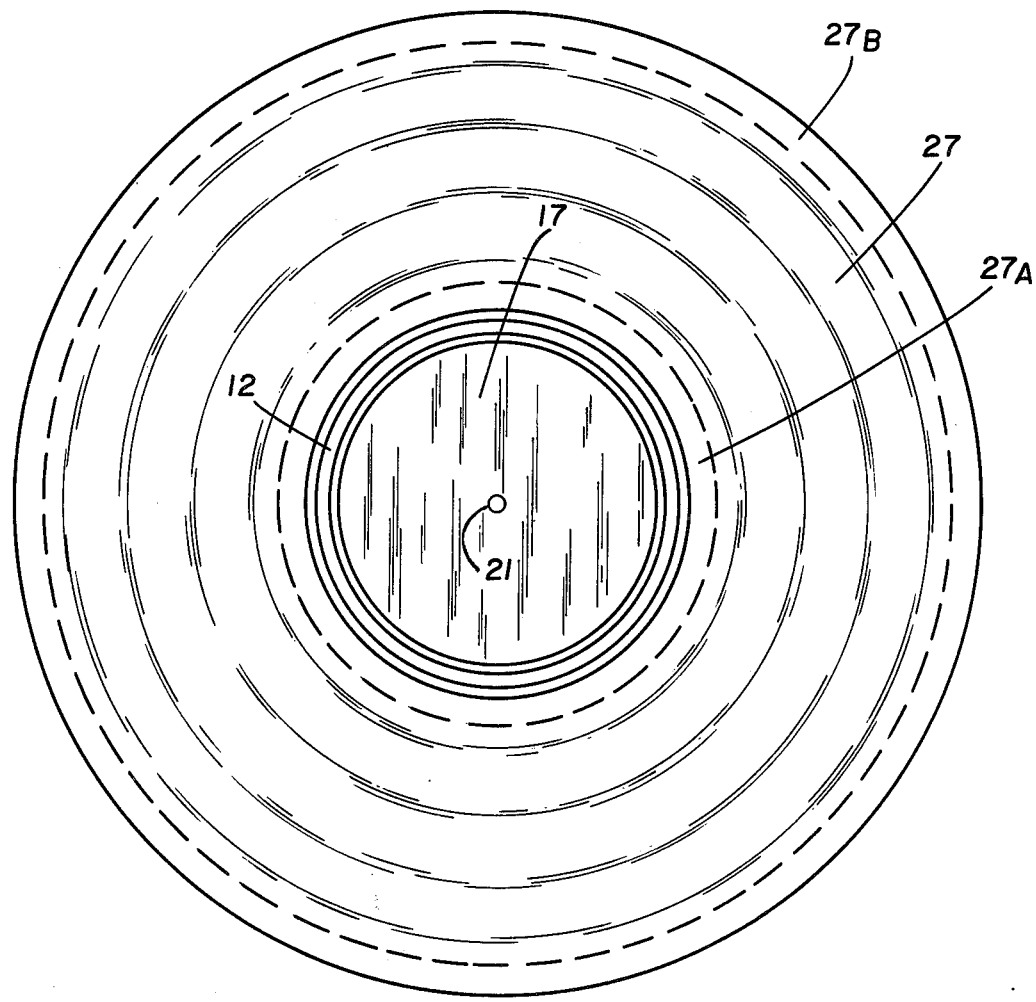
FIG. 4 is a plan view of the sensor module shown in FIG. 3 illustrating the annular isolation diaphragm configuration.

In FIG. 4, the plan view of the housing 12 is shown. The annular edge 27B adjacent the outer edge of the housing extends all the way around the periphery of the half section of the cell module, and the annular inner seal at the edge of the mounting portion 15 for the diaphragm 27 is seen at 27A. Thus, after two cell halves have been constructed in this manner, they are placed together with the sensing diaphragm 14 therebetween. The diaphragm 14 is normally stretched taut and the edge portions 27B and 28B of the isolation diaphragms are clamped tightly in contact with diaphragm 14. The assembly is then welded around its periphery or rim at this junction, as shown at 30 in FIG. 2. The weld 30 seals the outer edges of the isolation diaphragm to the housing sections. The diaphragms 14 is welded to the metal housing sections and also to the isolation diaphragms 27 and 28. The weld 30 further holds the two housing sections together.

After the two sensor module halves have been assembled, the tubes 21 are still open, and the interior passageways of the tubes are used for filling oil or other incompressible fluids into the cavities on both sides of the sensor diaphragm which are indicated at 31 and 32, respectively. The cavities or chambers are formed between the diaphragm 14 and the respective cell halves 12 and 13.

When the chambers 31 and 32 are completely filled with oil, and the filling tubes 21 and 22 are also completely filled, the tubes are pinched off and sealed as at 21A and 22A so that the housing interior is a completely sealed unit. The tubes themselves can be used for connecting electric leads that lead to the respective fixed capacitor plates 17 and 18. The connection of the wires is not shown, but can be done in any suitable manner.

Likewise, now it is apparent that any pressure differential in chambers 23A and 24A, which would be connected to sources of pressure to be measured through passageways 25 and 26, will act on the respective flexible isolation diaphragms 27 or 28. The pressure at each of the chambers 23A and 24A is transmitted through the oil filling (or incompressible fluid) in the chambers 31 and 32 to the stiff sensing diaphragm. Any differential in pressure will cause the diaphragm 14 to deflect toward the chamber having the lower pressure. This would in turn cause the oil in the chamber of the lower pressure side of diaphragm 14 to push one isolation diaphragm, for example, diaphragm 27 if passageway 26 is subjected to higher pressure, up toward the adjacent recessed surface, for example, surface 23. The movement of the diaphragm 14 changes the spacing of the diaphragm 14 with respect to the fixed capacitor plates 17 and 18, and this change in spacing can be sensed as a change in capacitance. It should be noted that in this case the volume of chambers 31 and 32, and the spacing of diaphragms 27 and 28 from the adjacent housing surfaces is selected so that the isolation diaphragms will bottom against their respective housing in either direction of movement before the diaphragm 14 bottoms out so that an overpressure stop is achieved by mechanical support of the isolation diaphragms. This will prevent overstressing of the diaphragm 14.

The corrugated flexible diaphragms 27 and 28 which form the isolation diaphragms are sufficiently flexible to allow for thermally induced oil volume variations, without affecting operation.

The fluid (oil) in tubes 21 and 22 does not affect the acceleration sensitivity along the central axis of the housing assembly adversely in that the oil in the tubes cannot move under acceleration until the force on the sensor is greater than the difference in pressure between the chambers 23A and 24A and the vapor pressure of the fluid filling the respective tubes. In normal use the chambers 23A and 24A carry some atmospheric pressure even at high altitudes and movement of oil from the tubes 21 or 22 does not occur. The remaining acceleration errors are mainly caused by the small weight of the thin diaphragms, and to a lesser degree by the remaining greatly reduced oil column between the sensing diaphragm and the flexible isolation diaphragms. The flexible isolation diaphragms permit the oil to move under acceleration in direction along the central axis of the housing and tend to deflect the sensing diaphragm. This action is particularly pronounced in the normal range of operation of the sensors disclosed, where low differentials, generally in the range below two atmospheres, are sensed.

The measured pressure fluid is only carried through the annular chambers 23A and 24A and not across the entire area of the sensing module. Consequently the capacitive electrodes may be located within the center opening of an annular isolation diaphragm located closely adjacent the measuring diaphragm and the "head" of the liquid filling in chambers 31 and 32 in direction along the central axis of the housing assembly is reduced to a level where oil induced acceleration errors are of the same order of magnitude as the acceleration errors of the diaphragms alone.

Stated another way, the isolation diaphragms define two separated chambers, each open to the active sensing element, which as shown is deflecting diaphragm 14, which extends transverse to the central axis of the housing assembly. The separated chambers are filled with substantially incompressible fluid. The isolation diaphragms each are annular diaphragms spaced from the sensing element, and each isolation diaphragm extends in direction along the central axis a minimal distance related to insure that changes in output of the sensing element (which is a deflecting diaphragm 14) caused by accleration effects of the incompressible fluid, when the pressure sensor is accelerated in direction along a central axis are not substantially greater than the changes in output of the sensing element caused by the mass of the isolation diaphragms and the sensing element during the same acceleration.

For example, if diaphragms 14, 27 and 28 are of steel having a specific gravity of 10.8 and thicknesses of 0.001 inches for diaphragms 27 and 28 and 0.003 for diaphragm 14, and the oil 31, 32 has a specific gravity of 0.9, then an oil column on each side of diaphragm 14 of 0.03 inch would give approximately the same magnitude of acceleration error for the oil columns and the diaphragms.

The drawings are of enlarged scale, and the height of the oil column from the stretched diaphragm may be approximately 0.02 inches. Yet the housing height can be made sufficiently great to provide dimensional rigidity for the sensor module. The isolation diaphragms are not externally exposed to forces or objects that might dent or damage the diaphragms in that they are enclosed within the housing sections. The sensors of the present invention are designed for operation in hostile environments.

Other types of transducing elements such as a reluctance transducer can be used if desired. Inductive sensors also can be used with the present assembly with a stationary member mounted on the housing and a movable member on the diaphragm 14. The advantages of having the low acceleration sensitivity by using an annular isolation chamber that permits reducing the head of the oil filling is a deired feature. As can be seen, substantially all portions of the isolation diaphragms are spaced not substantially farther from the sensing diaphragm 14 than the capacitor plate elements 17 and 18.

The spacing between the isolation diaphragm and the sensing diaphragm is preferably kept to a minimum. It is important that the sensing diaphragm does not contact the isolation diaphragm during use across the normal range of pressure, and thus, the fluid or oil filling forms a layer only sufficiently thick so that the spacing between the isolation diaphragm and the sensing diaphragm is not reduced to zero when the pressure sensor is at its minimum operating temperature. The incompressible fluid or oil will contract as the temperature drops, and there must always be a thin film of oil between the isolation diaphragm and the sensing diaphragm at all operating temperatures. The entire surfaces of the active (movable) portions of each of the isolation diaphragms are directly facing and in registry with portions of the sensing diaphragm and the incompressible fluid does not have to pass through orifices or passageways from a separate chamber open to the respective isolation diaphragm to a chamber open to the sensing diaphragm.

This lack of flow restriction in the oil chambers results in a much faster response time to rapidly changing pressures than transducers which have restrictions. If highly overdamped response is desired very high viscosity oil may be used.

What is claimed is:

1. A pressure sensor for operation in environments requiring a desired design minimum temperature, comprising a housing, means defining a cavity in said housing at one end thereof, a first diaphragm fixed to said housing and enclosing said cavity, said first diaphragm having portions which deflect relative to the housing under pressure, a second flexible diaphragm sealingly fixed to said housing within said cavity and separating the first diaphragm from first portions of said cavity and defining an isolation chamber with respect to said first portions of said cavity, means to supply a pressure to be measured to said isolation chamber, said second diaphragm having a surface facing the first diaphragm, an incompressible fluid layer between substantially the entire surface of said second diaphragm facing said first diaphragm, said fluid layer being of minimal dimension in direction substantially normal to said first diaphragm and sufficient only to form a fluid layer between said diaphragms which transfers pressures in said isolation chamber acting on said second diaphragm through said fluid to change deflection of said deflecting portion of the first diaphragm and prevent the first and second diaphragms from contacting each other in the deflecting portions of the first diaphragm at said desired minimum temperature during operation of said sensor to minimize the fluid head in direction substantially normal to said first diaphragm, and means supported on second portions of said housing cavity different from the first portions to sense deflection of said first diaphragm from a reference position.

2. The combination as specified in claim 1 wherein said means to sense deflection comprises means to sense differences in electrical impedance including a generrally flat plate member defining a surface facing said first diaphragm, said plate member being fixed to said housing at said second portion, and said first diaphragm including means to affect electrical impedance between the first diaphragm and said plate member, and said first diaphragm being sufficiently close to said plate member at its reference position to permit sensing changes in impedance as said first diaphragm deflects, said second flexible diaphragm having all deflecting portions thereof spaced from said first diaphragm not substantially greater than the spacing of said flat plate member from said first diaphragm.

3. The combination as specified in claim 1 wherein said second flexible diaphragm is at least part annular, and wherein said second portions are adjacent to the central axis of said first diaphragm.

4. A pressure sensor comprising a housing having an outer peripheral edge, and an end surface defined by said outer peripheral edge, a diaphragm sealingly mounted to said housing around said outer peripheral edge, said diaphragm being deflectable under pressure with respect to said end surface, a second flexible diaphragm joined to said housing on first portions only of said end surface to define an isolation chamber fluidly separated from said first mentioned diaphragm, second portions of said surface being open to said first mentioned diaphragm, means mounted on said second portions of said surface to detect deflections of said first mentioned diaphragm under pressure, a pressure connection from a pressure source to be measured open to said isolation chamber, an incompressible fluid filling all spaces between said first mentioned diaphragm said flexible diaphragm and the second portions of said surface, said fluid spacing said flexible diaphragm sufficiently far from said first mentioned diaphragm to permit a minimal layer of said incompressible fluid to remain between said first mentioned and second diaphragms during operation of said pressure sensor.

5. A pressure sensor for operation at a minimum design temperature comprising a housing having a generally central axis along which axis acceleration effects are to be minimized, said housing having an end surface generally normal to said axis at one end thereof, a first isolation diaphragm sealed with respect to first portions of said surface, and spaced from said first portions to form an isolation chamber between said first portions and said first isolation diaphragm, a pressure fitting open to said isolation chamber, a second sensing diaphragm mounted to said housing enclosing said first isolation diaphragm and second portions of said housing end surface to define a sealed chamber open to said first isolation diaphragm across substantially the entire surface of said first isolation diaphragm on an opposite side of said first isolation diaphragm from said isolation chamber and open to said second portions of said housing end surface, said first isolation diaphragm being positioned at a minimal spacing from said second sensing diaphragm across generally the entire deflecting surface of said first isolation diaphragm, and an incompressible fluid filling the chamber formed by said second sensing diaphragm with respect to said first isolation diaphragm and said second portions of said housing end surface, said incompressible fluid being minimized in volume so that when the fluid is at said minimum design temperature during use the incompressible fluid forms a thin fluid film across all portions of said first isolation diaphragm, means positioned on said second portions of said housing end surface to sense deflections of said second sensing diaphragm from a reference position comprising AC electrical impedance sensing means including a plate element mounted on said second portions of said housing end surface adjacent to said second sensing diaphragm, said second sensing diaphragm comprising means to affect electrical impedance relative to said plate element, and said plate element being sufficiently close to sense the impedance changes caused by deflection of said second sensing diaphragm, all portions of said first isolation diaparm being spaced not substantially farther from said second sensing diaphragm then said plate element in direction along said central axis.

6. The combination as specified in claim 5 wherein said planar plate element comprises a first capacitor plate, and said second diaphragm comprises a second capacitor plate.

7. A differential pressure sensor comprising a housing having a central axis, an active sensing element comprising a deflecting diaphragm extending transverse to said central axis of said sensor and deflecting in response to differentials in pressure on opposite sides of said diaphragm, separate isolation diaphragms mounted to said housing on opposite sides of said deflecting diaphragm to define two separated chambers each open to one surface of the deflecting diaphragm, said deflecting diaphragm being mounted substantially midway between said isolation diaphragms, said chambers being filled with a substantially incompressible fluid, said isolation diaphragms each being capable of being subjected to pressure on sides thereof opposite from said chambers and each comprising an annular diaphragm spaced from the deflecting diaphragm in direction along said central axis a minimal distance, said distance being selected to insure that deflection of the deflecting diaphragm caused by acceleration effects of the incompressible fluid when the pressure sensor is accelerated in direction along its central axis is not substantially greater than deflection thereof caused by the mass of the isolation diaphragms and the deflecting diaphragm during the same acceleration, said deflecting diaphragm comprising capacitor plate means, and separate fixed capacitor plate means on said housing facing opposite surfaces of said deflecting diaphragm.

8. The combination of claim 7 wherein a separate one of said isolation diaphragms surrounds each of said fixed capacitor plate means, said housing having recessed surfaces defined therein on sides of said isolation diaphragms opposite from the chambers formed by the respective isolation diaphragms, said recessed surfaces being open to pressure being sensed and forming supports for supporting the respective isolation diaphragm when each isolation diaphragm is deflected toward the respective recessed surface by high pressure on the other of said isolation diaphragms.

9. A pressure sensing module comprising a housing having a central axis and a peripheral rim, a central mounting portion surrounding the central axis and having a mounting portion peripheral edge spaced inwardly toward the central axis from the peripheral rim, a first flexible diaphragm surrounding said mounting portion and sealingly fixed to said housing adjacent the mounting portion peripheral edge and also sealingly fixed to the housing adjacent the peripheral rim, a deflecting sensing diaphragm sealingly fixed to the peripheral rim of the housing and extending across said housing to form an enclosed chamber in cooperation with the first diaphragm and the mounting portion, sensing means mounted on said mounting portion sensing displacement of the deflecting diaphragm relative to said mounting portion, said chamber being filled with a substantially incompressible fluid, and pressure sensing passage means open to a side of said first diaphragm opposite from said chamber, said sensing means comprises a first electrical sensing element carried by said mounting portion, said deflecting diaphragm comprising a second electrical sensing element, said electrical sensing elements being sensitive to relative displacement between said mounting portion and said deflecting diaphragm.

10. The sensor of claim 9 wherein said sensor module comprises two housings each constructed substantially identically and joined to said sensing diaphragm, said sensing diaphragm comprising a bisecting member.

11. The sensor of claim 10 and a peripheral weld means joining the peripheral rim of said housings and sealing the edges of the respective isolation diaphragms and the sensing diaphragm.

12. The sensor of claim 9 wherein said mounting portion comprises an electrical insulation on material, and said first and second sensing elements comprise capacitor plate means.

13. A pressure sensor comprising a housing portion having a generally central axis, said housing portion having a surface extending laterally to said axis, a first isolation diaphragm forming an isolation chamber with respect to first portions of said surface, to form a pressure receiving isolation chamber, a sensing diaphragm mounted to said housing enclosing said isolation diaphragm and second portions of said surface to define a sealed chamber open to said isolation diaphragm on one side of said isolation diaphragm opposite from said isolation chamber and open to said second portions of said surface, an incompressible fluid filling the sealed chamber, and means on said second portions of said surface to sense deflections of said sensing diaphragm from a reference position, said isolation diaphragm and said sensing diaphragm being positioned at a minimal distance from each other by said substantially incompressible fluid to reduce acceleration effects of said incompressible fluid on said sensing diaphragm during acceleration of the sensor along said central axis.

14. The sensor as specified in claim 13 wherein said means to sense deflection of said sensing diaphragm comprises AC electrical impedance sensing means.

15. The sensor as specified in claim 13 wherein said first surface portions are at least part annular around and spaced from said central axis, and said second portions of said surface are adjacent said central axis.

* * * * *